Nov. 11, 1958
R. F. ADAMS
2,859,509
FABRICATION OF HOLLOW ARTICLES
Filed Feb. 24, 1956
2 Sheets-Sheet 1
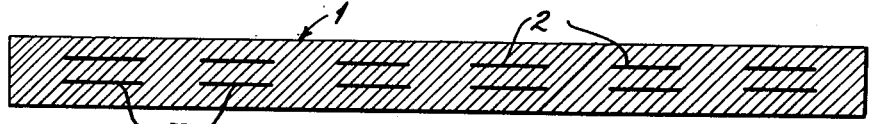
FIG.1.
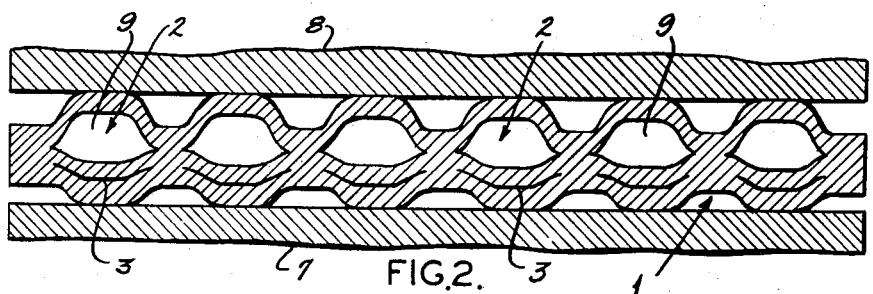
FIG.2.
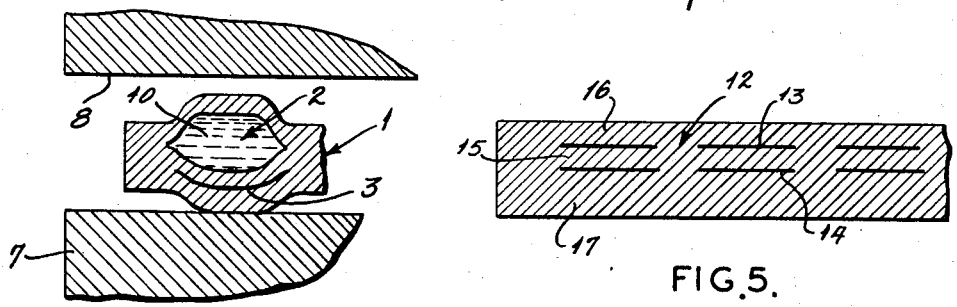
FIG.3.
FIG.5.
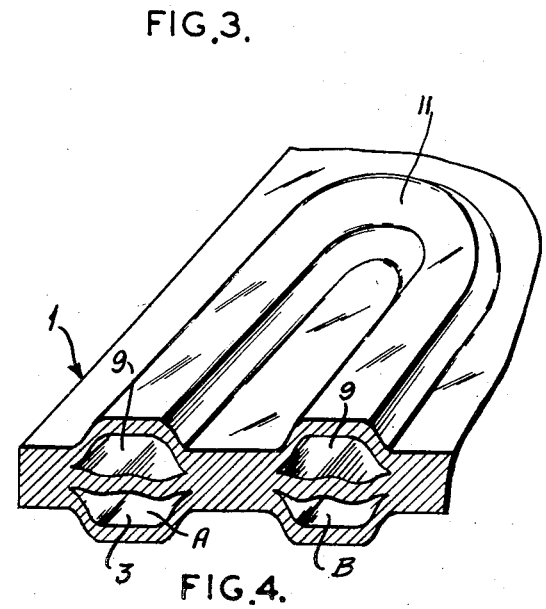
FIG.4.
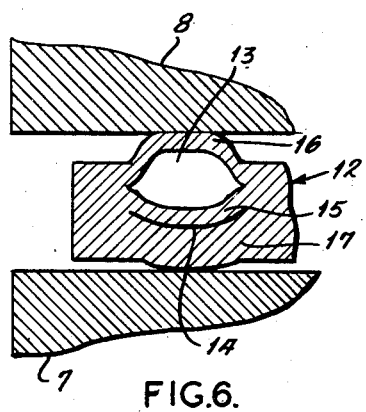
FIG.6.
INVENTOR:
RICHARD F. ADAMS
ATTORNEYS Nov. 11, 1958 R. F. ADAMS 2,859,509
FABRICATION OF HOLLOW ARTICLES
Filed Feb. 24, 1956 2 Sheets-Sheet 2

INVENTOR:
RICHARD F. ADAMS
By
ATTORNEYS

United States Patent Office 2,859,509
Patented Nov. 11, 1958

2,859,509

FABRICATION OF HOLLOW ARTICLES

Richard F. Adams, Goshen, Ind., assignor to Olin Mathieson Chemical Corporation, East Alton, Ill., a corporation of Virginia Application February 24, 1956, Serial No. 567,532

8 Claims. (Cl. 29—157.3)

This invention relates to the fabrication of multi-cellular or multi-layer hollow panels and more specifically to a plural stage method of expansion of such panels and is a continuation-in-part of my U. S. application Serial No. 376,133 filed August 24, 1953, now Patent No. 2,766,514.

In a well known method of fabricating hollow panels such as heat exchangers used in domestic refrigerators and the like it is the practice to apply a desired design of weld-inhibiting material on a clean surface of a metal sheet, place the second sheet on the surface to which the weld-inhibiting material has been applied in stack-like or laminar arrangement and weld the two sheets together as by hot rolling, thereby providing an integral panel having an internal unjoined portion in the area of the weld-inhibiting material. The panel is then expanded by a fluid pressure introduced between the inner surfaces of the unjoined portion to permanently distend the unjoined portion. This process of fabricating hollow panels is fully described in the patent to Grenell U. S. 2,690,002. The panels may be expanded into shaping dies which provide the distended portion with any desired configuration or between restraining platens which are usually flat thereby providing the outer surfaces of the distended portion of the panel with flat surfaces, or without restraint of any sort whereupon the distended portion is of oval cross sectional configuration. When a panel is expanded between platens or into dies a pressure greatly in excess of the rupture pressure of the panel if unrestrained is utilized.

The previously described process for fabricating hollow single layer panels is equally applicable for the fabrication of multi-layer panels or in other words, panels having a plurality of unjoined portions one above the other in a stack-like arrangement. The fabrication of such multi-layer panel blanks is much the same as the fabrication of the blank described in the preceding paragraph and is completely described in my previously mentioned copending application. Any number of unjoined layers may be provided in one blank by imprinting a weld-inhibiting pattern on appropriate surfaces of the stack of the sheets to be bonded together. Difficulty has been encountered in expanding multi-layer units and it has been found necessary to specially design the alternate unjoined layers of each panel to facilitate proper distention of each layer. Attempts to expand interconnected multi-layer panels by applying fluid pressure through a common inlet to distend all the layers simultaneously usually results in one unjoined layer being partially distended and thereby preventing expansion of an adjacent layer by sealing off the passages in the adjacent layer. Additional application of pressure to the partially distended pattern will fully expand this pattern without opening the other layer and permitting it to expand.

The forming process described hereinafter may be applied to multi-layer panels fabricated by processes other than that described in the aforementioned patent. The sheets which make up the blank may be secured together by methods other than hot rolling, such as by an adhesive and may be of materials other than metal, for example, plastics or polyethylene.

It is therefore an object of this invention to provide an improved method of expanding multi-layer panels.

Another object of this invention is to expand a multi-layer panel while preventing uncontrolled distortion of the layers.

Additional objects and advantages will be apparent from the following description and drawings in which:

Figure 1 is a sectional view of a multi-layer welded panel prior to expansion;

Figure 2 is a sectional view of the welded panel of Figure 1 positioned between a pair of restraining platens and showing one of the hollow layers distended into firm engagement with the platens;

Figure 3 is a sectional view similar to Figure 2 but with the restraining platens spaced apart a distance greater than the thickness of the partially distended panel in preparation for expanding another unwelded layer and with the previously distended hollow portion containing a filler material;

Figure 4 is a partial sectional view of the panel shown in Figure 1 after it has been completely expanded and removed from between the platens;

Figure 5 is a sectional view similar to Figure 1 but showing a modified form of a multi-layer panel;

Figure 6 is a sectional view similar to Figure 2 but showing the panel of Figure 5;

The invention comprehends expansion of multi-layer hollow panels by expanding each of the layers separately by introducing a force such as a fluid pressure into each unjoined layer. After expansion of the first layer the resultant hollow portion is filled with a filler material and the second layer is expanded. In a panel having more than two unjoined layers each subsequent layer is expanded in the same manner as previously described with the previously distended layers having first been filled with a filler material. The filler material may be a liquid and may be solidified in the distended portion or it may be a solid such as sand, as more fully described hereinafter. In the event that it is desired to use a solid as a filler material the filler is preferably solidified after it is introduced into the hollow portion in the liquid state. If the expanding medium is a liquid it may be retained in the distended portion in either the liquid or solid state while subsequent layers are being expanded. In a modified form of the invention the thickness of the sheets comprising the panel may be varied to compensate for undesirable distention as subsequent layers are expanded as will be fully described hereinafter.

Figure 9:
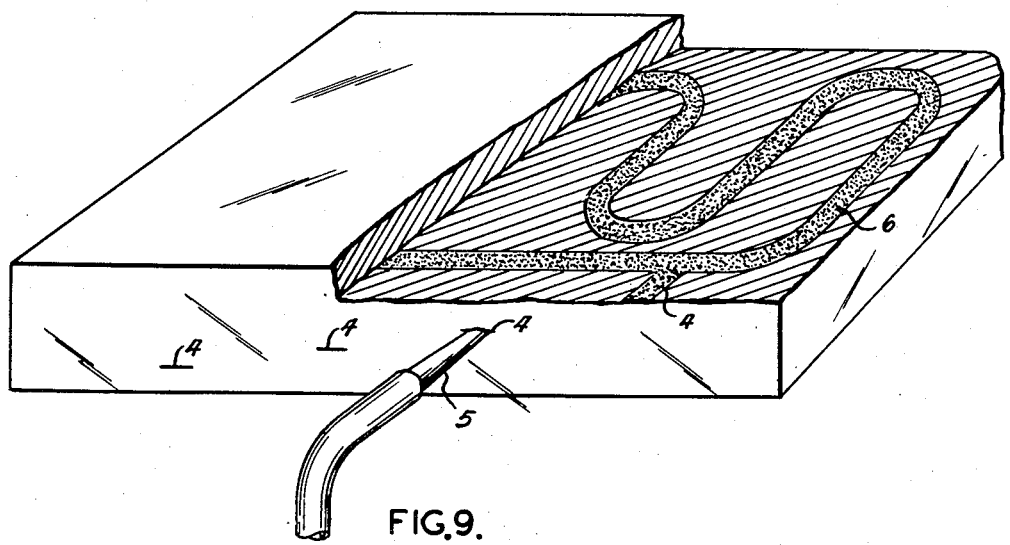
Figure 9 is a partial sectional view showing a blank prior to expansion.

Referring to Figure 1, a panel blank 1 fabricated in the previously described manner has two unjoined layers 2 and 3 positioned in stack-like or laminar arrangement. Any number of such unjoined layers may be provided in the panel blank and each layer may assume any desired configuration as shown in Fig. 9, since it is not necessary to maintain any particular relationship between the unjoined pattern of the various layers when the panel is expanded as described herein. Normally the unjoined portions in a layer will be interconnected so that the entire layer may be expanded simultaneously. As shown in Fig. 9, each unjoined layer is provided with a passageway 4 for reception of a nozzle 5 through which a fluid is forced into the unjoined layer to expand it. However, it is not mandatory that the unjoined portions of a layer be interconnected but if they are not interconnected it will be necessary to expand each portion of the layer separately. The nozzle receiving passageways of the separate layers should be staggered to prevent insertion of the nozzle 5 into one of the passageways 4 deforming another passageway 4. The unjoined layers 2 and 3 are not interconnected or at least they are not interconnected in such a manner that while they are being expanded the fluid can pass from one layer 2 to another layer 3. The previously indicated patent application discloses various patterns of weld-inhibiting material used in panels of this type but it should be noted that one of the features of this process of fabricating hollow panels is the flexibility of the pattern design 6 which may be incorporated therein.

Referring to Figure 2 the panel has been placed between a pair of restraining platens 7 and 8 and one of patterns 2 of weld-inhibiting material has been distended as by introducing a fluid pressure into this unjoined layer. The pressure is sufficiently high to distend the unjoined portion 2 of the panel into firm engagement with the restraining platens 7 and 8. The expansion pressure is then released, the platens 7 and 8 moved apart and the panel 1 removed from between the platens. Thus far the expansion process is the same as if a single layer panel were being expanded. The process does not require the use of restraining platens as 7 and 8 and either multilayer or conventional single layer panels may be expanded without restraint of any type, but it is then necessary that a lower expansion pressure be applied to prevent rupturing the panels.

Following expansion of the first unjoined layer 2 the hollow portion 9 thus formed is filled with a suitable filler material 10 to prevent collapse or undue distortion of the hollow portion 9 during expansion of subsequent unjoined layers as 3. When the fluid used in expanding the first unjoined layer 2 is a liquid it may be maintained in the distended portion 9 and serve as the filler material 10. When the panels have been expanded between restraining platens as 7 and 8, it will be necessary to reduce the pressure of the expansion fluid prior to removal of the panel 1 from the restraining platens 7 and 8 to prevent the panel from rupturing. In expanding subsequent unjoined layers, as 3, the filler 10 may be maintained as a liquid although it is preferable to freeze the filler to a solid. Although a liquid used to expand a layer may be retained as a filler it has generally been found advantageous to remove this liquid and substitute another liquid, as will be more fully discussed hereinafter. In any event, the filler material 10 should completely fill the hollow portion 9 and should be relatively non-compressible.

After the filler material 10 has been inserted into the previously expanded portion 9 the panel is positioned between restraining platens 7 and 8 as shown in Figure 3. The platens are spaced apart a greater distance than the thickness of the distended panel. The second unjoined layer 3 is then expanded usually by a fluid pressure introduced therein, as previously described in conjunction with the expansion of the first layer 2. Again it is not mandatory that the expansion of the panel 1 be restrained between platens. A filler material 10 is maintained in each previously distended layer 9 and each newly expanded layer is similarly filled with a filler material prior to expansion of another layer.

Figure 4 shows a sectional view of a portion of the completely distended panel. The bight 11 of the distended portion 9 of the panel 1 indicates one method in which the passageways of a layer may be interconnected. After all the layers of the panel have been expanded the filler material 10 is removed and the layers are cleaned and dried in any appropriate manner.

Figure 7:
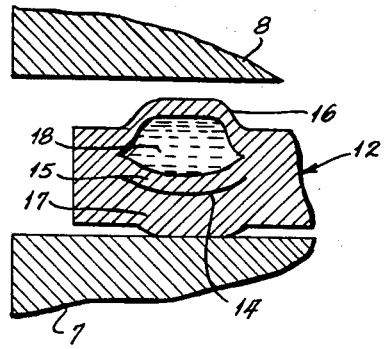
Figure 7 is a sectional view similar to Figure 3 but showing the panel of Figure 6.
Figure 8:
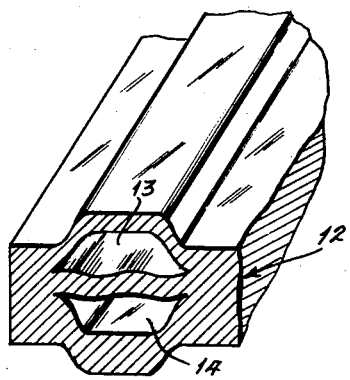
Figure 8 is a partial sectional view of the panel shown in Figure 5 after it has been completely expanded and removed from between the platens.

Figures 5 through 8 show a modified panel 12 which results in more uniform distention of each of the unjoined layers 13 and 14. Referring to Figure 5 it will be noted that unjoined portions 13 and 14 are separated by approximately the same thickness of metal 15 as the thickness of metal 16 between the top unjoined layer 13 and the top surface of the panel 1. However, the thickness of the metal 17 between the lower unjoined layer 14 and the bottom surface of the sheet is substantially greater than the previously mentioned thicknesses 15 and 16. Upon expansion of the upper unjoined layer 13 the resultant lower wall 15 and 17 is not deformed downwardly to as great a degree as is the similar wall in Figures 2 and 3. This is because of the greater thickness of the metal of the lower wall 15 and 17 of the distended layer 13 over the thickness of the upper wall 16. In other words, the thinner portion 16 of the panel distends more than does the thicker portion 15 and 17. Upon expansion of the lower unjoined layer 14 the intermediate portion 15 between the distended layers 13 and 14 is moved upwardly to a slight degree whereas most of the distention is in the downward direction resulting in the cross sectional configuration shown in Figure 8. It should be noted that the distance between the lower unjoined layer 14 and the top outer surface of the inflated layer including the filler material 18 in Figure 7 is much greater than the thickness 17 downward from the lower unjoined layer which results in the lower portion of the panel distending more than the upper portion. Any number of layers may be expanded in this manner and the thicker sheet 17 may be between two thinner sheets, as 15 and 16. With the exception of the different relative vertical placement of the unjoined layers of the panels shown in Figures 1 and 5 the process described in conjunction with Figures 1 through 4 is precisely the same for the modification shown in Figures 5 through 8.

Referring to Figures 5 through 8, the filler material 18 may be any substance which will satisfactorily prevent deformation of the distended portion 13 upon expansion of subsequent unjoined layers 14 of the panel. In the event that water or oil is used in expanding layer 13 of the panel it may be maintained in the distended portion and serve as a filler 18. This is generally not as satisfactory as removing the fluid and filling the distended layer 13 with another filler material 18 as will be evident hereinafter. The filler 18 may be maintained in the distended portion 13 in the form of a liquid, however, a solid provides a better filler because if a liquid is used upon expansion of an adjacent layer 14 the liquid filler travels from one portion of the previously distended layer 13 to another progressively expanding the previously distended layer 13. For example, in Figure 4 when the lower layer 3 is being expanded the fluid first enters the left hand passageway A and forces its way through this passageway to the right hand passageway B. The passageways are progressively forced open so that the left hand passageway A may be fully open while the right hand passageway B is still completely closed. As the expansion fluid is driven through this unjoined layer 3 the pressure on a liquid filler material 10 in the adjacent previously distended layer 2 will be progressively increased simultaneously moving with the expanding fluid resulting in uneven deformation of the adjacent portions of the panel. By freezing a liquid filler material 10 in the distended layer this movement and progressive increase in pressure is substantially eliminated so that the adjacent portions of the panel receive the same deformation as the adjacent unjoined layer is expanded. Water, sulphur, bismuth or the like is suitable as a filler material. Solids such as sand or other granular materials may also be used as a filler material. In any event, better results are obtained if a liquid filler material is solidified prior to the expansion of subsequent unjoined layers. A filler material should be selected which will not adversely affect the expansion fluid. For example, if water is used as an expansion medium and solidified water is used as a filler material the expansion water may solidify upon introduction into the unjoined layer and should the unjoined layer be of a complicated design such solidification may prevent the proper expansion of the portions of the layer remote from the point of introduction of the expansion fluid. Similarly if a liquid filler having a high melting point is used the expansion water might flash to steam in which event the expansion pressure could not be adequately controlled. Solidified water is one of the most convenient mediums to use as a filler material since it is readily available and cheap and the panels may be handled at convenient and safe temperatures. If water is used as both the expansion and filler medium the expansion water should be provided with an anti-freeze of any convenient type to prevent its solidifying in the layer which is being expanded and for this reason it is better practice not to attempt to use the expanding fluid as a filler.

Although the foregoing description makes particular reference to a hollow two layer metal panel the invention is equally applicable to hollow panels fabricated of materials other than metal, such as various plastic materials, and the panels may have any number of layers in excess of two. The layers of the panel may be secured together by adhesive or other appropriate means rather than by hot rolling described in conjunction with the aforementioned metal panels. Nor is the invention necessarily to be limited to panels expanded by the injecting of a fluid pressure into the unjoined layers and materials which will expand under certain circumstances may be applied to the unjoined portions of the panel prior to joining the sheets together to form a blank. Various modifications will be apparent to one skilled in the art and the invention is therefore not to be limited to the specific embodiments, materials or details disclosed in the foregoing description except as set forth in the appendant claims.

I claim:

1. The method of fabricating a hollow metal panel having a plurality of hollow portions arranged in laminar fashion, said method comprising applying a weld-inhibiting material on a portion of faces of a plurality of sheets of ductile metal, positioning said sheets in face-to-face laminar fashion, welding the faces of said sheets together in the areas of said faces not adjacent to said weld-inhibiting material by hot rolling to produce an integral blank having a plurality of partially unjoined layers arranged in laminar fashion; expanding one of said unjoined layers at a time by injecting therein a fluid pressure of sufficient magnitude to substantially permanently distend said layer, filling said expanded layer except the last with a liquid filler material and solidifying it to retard excessive subsequent deformation of said distended layer upon expansion of another unjoined layer and then similarly expanding said other unjoined layers.

2. The method of expanding a blank of plastically deformable material having defined within its outer surfaces a plurality of superimposed unjoined layers having a common wall between at least portions of adjacent unjoined layers in overlying and underlying relationship with respect to each other, said method comprising expanding one of said unjoined layers by introducing therein a fluid under sufficient pressure to substantially permanently distend and fill the unjoined layer, and subsequently expanding another unjoined layer similarly by the introduction of fluid under pressure while maintaining the first filled with a supporting material thereby preventing excessive undesired distortion of said prior distention.

3. The method of claim 2 wherein the first expanded unjoined layer is filled with a liquid and which includes the intermediate step of solidifying said liquid to form an incompressible filler as the supporting material prior to expansion of said second layer.

4. The method of claim 2 wherein filling of the first unjoined portion is accomplished as a separate step with a separate incompressible filler as the supporting material after expansion of the first and prior to expansion of the second.

5. The method of claim 4 wherein the separate filler includes a particulate solid.

6. The method of fabricating a hollow article comprising the steps of defining in a blank substantially completely enclosed unjoined layers adjacent pairs of which have a common wall between at least portions of each of said adjacent unjoined layers in overlying and underlying relationship with respect to each other, each layer extending continuously and including elongated passageways between adjacent pairs of a plurality of component sheets of plastically deformable material affixed in face-to-face arrangement by permanently joining together interfacial portions of said sheets adjacent said layers, injecting into one of said unjoined layers a fluid pressure of sufficient magnitude to substantially permanently distend the unjoined wall portion of said layer to final shape and volume, filling and maintaining said expanded layer full of incompressible material, and then similarly distending another unjoined layer and filling all except the last layer with said material until all said layers have been distended separately and without excessive distortion from adjacent layers.

7. The method of claim 6 wherein said injection and filling of the unjoined layer is accomplished with the same material.

8. The method of claim 6 wherein said filler material is a solid at least prior to and during the subsequent distention of said second unjoined layer.

References Cited in the file of this patent

UNITED STATES PATENTS

| | | |
|---|---|---|
| 1,723,659 | Rosenqvist | Aug. 6, 1929 |
| 2,190,494 | Templin | Feb. 13, 1940 |
| 2,212,481 | Sendzimir | Aug. 20, 1940 |
| 2,595,472 | Larkin | May 6, 1952 |
| 2,626,130 | Raskin | Jan. 20, 1953 |
| 2,662,273 | Long | Dec. 15, 1953 |
| 2,700,211 | Woolf | Jan. 25, 1955 |
| 2,740,188 | Simmons | Apr. 3, 1956 |